US007022401B2

(12) United States Patent
Obayashi et al.

(10) Patent No.: US 7,022,401 B2
(45) **Date of Patent: *Apr. 4, 2006**

(54) ANTI-REFLECTION FILM, AND IMAGE DISPLAY DEVICE

(75) Inventors: Tatsuhiko Obayashi, Minami-ashigara (JP); Takafumi Hosokawa, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 98 days.

This patent is subject to a terminal disclaimer.

(21) Appl. No.: 10/610,828

(22) Filed: Jul. 2, 2003

(65) Prior Publication Data

US 2004/0012317 A1 Jan. 22, 2004

(30) Foreign Application Priority Data

Jul. 8, 2002 (JP) ............................ 2002-199203

(51) Int. Cl.
*B32B 7/02* (2006.01)
*B32B 27/08* (2006.01)
*B32B 27/28* (2006.01)
*B32B 27/30* (2006.01)

(52) U.S. Cl. ...................... 428/212; 428/421; 428/522; 526/242; 526/245; 526/247; 359/580; 359/586; 359/601

(58) Field of Classification Search ................ 526/254; 428/212, 421, 522
See application file for complete search history.

(56) References Cited

U.S. PATENT DOCUMENTS 6,087,010 A * 7/2000 Yoshida et al. ............. 428/421
6,271,326 B1 8/2001 Nishikawa et al.
6,777,070 B1 * 8/2004 Murata et al. .............. 428/323
6,794,469 B1 * 9/2004 Obayashi et al. ........... 526/247

FOREIGN PATENT DOCUMENTS

JP 63-51418 A 3/1988
JP 2000-17028 A 1/2000
JP 2002-036457 A * 2/2002
WO WO 2000/22461 * 4/2000

* cited by examiner

*Primary Examiner*—Vivian Chen
(74) *Attorney, Agent, or Firm*—Buchanan Ingersoll PC

(57) ABSTRACT

An anti-reflection film, which has a low-refractive-index layer composed of a cured coating of a copolymer that has a main chain consisting of carbon atoms and has a fluorine-containing vinyl monomer polymerizing unit and a polymerizing unit having in its side chain a (meth)acryloyl group.

7 Claims, 1 Drawing Sheet

Fig. 1(a)
Fig 1(b)
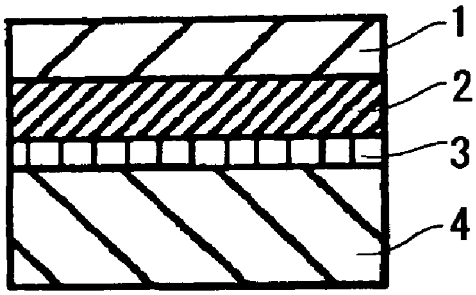
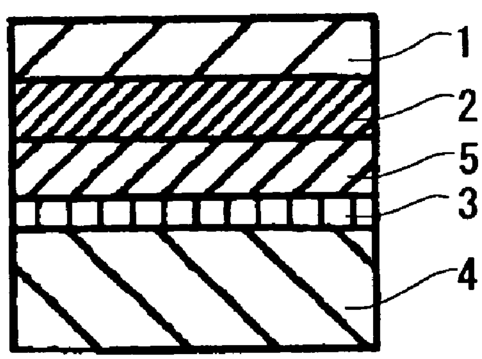

ANTI-REFLECTION FILM, AND IMAGE DISPLAY DEVICE

FIELD OF THE INVENTION

The present invention relates to an anti-reflection film, and a display device (in particular, a liquid crystal display device) using the same.

BACKGROUND OF THE INVENTION

In a display device such as a cathode ray tube display device (CRT), a plasma display (PDP), an electroluminescence display (ELD), or a liquid crystal display device (LCD), an anti-reflection film is generally arranged on the outermost surface of the display device to decrease the reflectance through the principle of optical interference to prevent a drop in the contrast owing to the reflection of external light or prevent reflection of undesired images in its screen.

Such an anti-reflection film can be produced by forming a high-refractive-index layer on a support and further forming a low-refractive-index layer having an appropriate thickness thereon. In this case, it is preferred from the standpoint of productivity that the respective layers can be formed by wet coating.

To realize low reflectance, the low-refractive-index layer is desirably made of a material whose refractive index is as low as possible. High scratch resistance is required for the anti-reflection film, since it is used as the outermost surface of a display. To lower the refractive index of the material, it is possible to adopt the method (1) of introducing a fluorine atom into the material, or the method (2) of lowering the density of the material (introducing voids into the material). However, with both of the methods, a tendency was generated for mechanical strength of the coating to be damaged and the scratch (abrasion) resistance to deteriorate. Thus, it was difficult to achieve both a low refractive index and high scratch resistance at the same time.

Various methods are known for curing a fluorine-containing polymer having a low refractive index. As described in, for example, JP-A-57-34107 ("JP-A" means unexamined published Japanese patent application), JP-A-61-258852, JP-A-61-275311, JP-A-62-185740, JP-A-62-292848, JP-A-8-92323, and JP-A-12-17028, generally, a polymer having a hydroxyl group or the like was cured by various hardeners. However, hardeners and fluorine-containing polymer had problems in mutual solubility (miscibility) in many cases. Therefore, improvements in the transparency of the resultant polymer, and the hardness of the coating, has been desired. Against the problems, JP-A-10-25388 disclosed a technique in which a melamine-series hardener and a hydroxyl group-containing low-refractive-index polymer, were heated beforehand, so as to be partially condensed. The technique was advantageous for making the transparency of the coating high to a certain extent, but it is difficult to say this effect was sufficient.

SUMMARY OF THE INVENTION

The present invention is an anti-reflection film, having a low-refractive-index layer made of a cured coating of a copolymer that has a main chain consisting of carbon atoms and comprises a fluorine-containing vinyl monomer polymerizing unit and a polymerizing unit having, in its side chain, a (meth)acryloyl group.

Further, the present invention is an anti-reflection film that has a transparent support.

Further, the present invention is an image display device, wherein the above anti-reflection film is arranged.

Other and further features and advantages of the invention will appear more fully from the following description, taken in connection with the accompanying drawings.

BRIEF DESCRIPTION OF THE DRAWINGS

FIGS. 1(*a*) and 1(*b*) each are a cross-sectional view schematically showing a layer structure in the case that the anti-reflection film (membrane) of the present invention is a multilayer film. FIG. 1(*a*) shows an example of 4-layer structure. FIG. 1(*b*) shows an example of 5-layer structure.

DETAILED DESCRIPTION OF THE INVENTION

The inventors eagerly studied the relationship between transparency, hardness, and refractive index of coatings. As a result, the inventors have found that a film made of a polymer having, in its side chain, a (meth)acryloyl group having a self-crosslinking reactivity, is superior. Further, they have found that, at a given refractive index, it is advantageous to decrease the use amount of a hardener and raise the content percentage of the (meth)acryloyl group in the polymer, in order to improve hardness of coatings. Thus, the present invention has been accomplished.

That is, the present invention provides:

1) An anti-reflection film, having a low-refractive-index layer made of a cured coating of a copolymer that has a main chain consisting of carbon atoms and comprises a fluorine-containing vinyl monomer polymerizing unit and a polymerizing unit having in its side chain a (meth) acryloyl group.

2) The anti-reflection film according to the item 1), wherein the copolymer is represented by the following formula 1:

formula 1

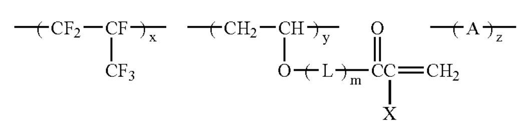

wherein L represents a linking group having 1 to 10 carbon atoms; m is 0 or 1; X represents a hydrogen atom or a methyl group; A represents a polymerizing unit of any vinyl monomer, and may be composed of a single component or plural components; x, y and z each represents a mole percent of the respective constituent, and x, y, and z satisfy $30 \leqq x \leqq 60$, $5 \leqq y \leqq 70$, and $0 \leqq z \leqq 65$, respectively.

3) The anti-reflection film according to the item 2), wherein the copolymer is represented by the following formula 2:

formula 2

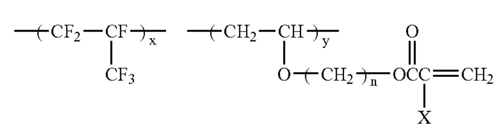

-continued

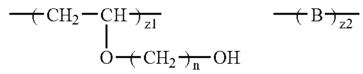

wherein X, x and y each has the same meaning as in the explanation on the formula 1; B represents a polymerizing unit of any vinyl monomer, and may be composed of a single component or plural components; z1 and z2 each represents a mole percent of the respective constituent, and z1 and z2 satisfy $0 \leqq z1 \leqq 65$, and $0 \leqq z2 \leqq 65$; and n is an integer satisfying $2 \leqq n \leqq 10$.

4) The anti-reflection film according to the item 3), wherein the copolymer satisfy $40 \leqq x \leqq 60$, $30 \leqq y \leqq 60$, and z2=0.

5) The anti-reflection film according to any one of the items 1) to 4), wherein a component originating from the copolymer occupies 90% or more by mass of solid contents in the low-refractive-index layer.

6) The anti-reflection film according to any one of the items 1) to 5), wherein the low-refractive-index layer is formed on a high-refractive-index layer comprising inorganic fine particles and a polyfunctional (meth)acrylate resin.

7) An anti-reflection film, wherein the anti-reflection film according to any one of the items 1) to 6) is formed on a transparent support.

8) An image display device, wherein the anti-reflection film according to the item 7) is arranged.

The anti-reflection film of the present invention may have a single-layer construction consisting of only one low-refractive-index layer, or alternatively a multi-layer construction in which a middle-refractive-index layer, a high-refractive-index layer, and a low-refractive-index layer are superimposed together with a hard coat layer and the like. The anti-reflection film having such a multi-layer construction is preferable. Especially preferred are those having a multi-layer construction in which at least three layers of a middle-refractive-index layer, a high-refractive-index layer, and a low-refractive-index layer are superimposed. This anti-reflection film may be directly formed (in-situ) on an image display device or the like, but it is preferable that the anti-reflection film, which may have a transparent support, is prepared in advance and is provided onto an image display device.

<Typical Layer Structure of the Anti-reflection Film>

With reference to FIGS. 1(*a*) and 1(*b*), typical examples of layer structure of the anti-reflection film of the present invention will be explained.

FIGS. 1(*a*) and 1(*b*) are sectional schematic views each illustrating an example of various preferable layer structures of the anti-reflection film of the present invention. The embodiment shown in FIG. 1(*a*) has a layer structure wherein a transparent support (4), a hard coat layer (3), a high-refractive-index layer (2) and a low-refractive-index layer (1) are arranged in this order. In an anti-refraction film having a high-refractive-index layer (2) and a low-refractive-index layer (1), as the one shown in FIG. 1(*a*), it is preferable that the high-refractive-index layer satisfy the conditions shown by the following expression (I) and the low-refractive-index layer satisfy the conditions shown by the following expression (II), respectively, as described in JP-A-59-50401:

$$\frac{m}{4}\lambda \times 0.7 < n_1 d_1 < \frac{m}{4}\lambda \times 1.3 \tag{I}$$

wherein m is a positive integral number (generally 1, 2 or 3), $n_1$, is the refractive index of the high-refractive-index layer, and $d_1$ is the thickness (nm) of the high-refractive-index layer;

$$\frac{n}{4}\lambda \times 0.7 < n_2 d_2 < \frac{n}{4}\lambda \times 1.3 \tag{II}$$

wherein n is a positive odd number (generally 1), $n_2$ is the refractive index of the low-refractive-index layer, and $d_2$ is the thickness (nm) of the low-refractive-index layer.

The refractive index $n_1$ of the high-refractive-index layer is generally higher at least by 0.05 than that of the transparent support. The refractive index $n_2$ of the low-refractive-index layer is generally lower at least by 0.1 than that of the high-refractive-index layer and lower at least by 0.05 than that of the transparent support. Further, the refractive index $n_1$ of the high-refractive-index layer is preferably in the range of 1.57 to 2.40.

The embodiment shown in FIG. 1(*b*) has a layer structure wherein a transparent support (4), a hard coat layer (3), a middle-refractive-index layer (5), a high-refractive-index layer (2) and a low-refractive-index layer (1) are arranged in this order. In an anti-refraction film having a middle-refractive-index layer (5), a high-refractive-index layer (2), and a low-refractive-index layer (1), as the one shown in FIG. 1(*b*), it is preferable that the middle-refractive-index layer satisfy the conditions shown by the following expression (III), the high-refractive-index layer satisfy the conditions shown by the following expression (IV), and the low-refractive-index layer satisfy the conditions shown by the following expression (V), respectively, as described in JP-A-59-50401:

$$\frac{h}{4}\lambda \times 0.7 < n_3 d_3 < \frac{h}{4}\lambda \times 1.3 \tag{III}$$

wherein h is a positive integral number (generally 1, 2 or 3), $n_3$ is the refractive index of the middle-refractive-index layer, and $d_3$ is the thickness (nm) of the middle-refractive-index layer;

$$\frac{j}{4}\lambda \times 0.7 < n_4 d_4 < \frac{j}{4}\lambda \times 1.3 \tag{IV}$$

wherein j is a positive integral number (generally 1, 2 or 3), $n_4$ is the refractive index of the high-refractive-index layer, and $d_4$ is the thickness (nm) of the high-refractive-index layer;

$$\frac{k}{4}\lambda \times 0.7 < n_5 d_5 < \frac{k}{4}\lambda \times 1.3 \tag{V}$$

wherein k is a positive odd number (generally 1), $n_5$ is the refractive index of the low-refractive-index layer, and $d_5$ is the thickness (nm) of the low-refractive-index layer.

The refractive index $n_3$ of the middle-refractive-index layer is generally in the range of 1.5 to 1.7. The refractive index $n_4$ of the high-refractive-index layer is generally in the range of 1.7 to 2.2.

Further, λ in formulae (I) to (V) represents a wavelength of visible radiation within the range of 380 to 680 nm. The terms "high-refractive index", "middle-refractive index", and "low-refractive index" described herein mean relative magnitude of the refractive indices among layers. For example, the middle-refractive-index layer can be prepared by a method changing the content of high-refractive-index inorganic fine particles contained in the high-refractive-index layer, or other methods.

The anti-reflection film having the above-described layer structure at least has a low-refractive-index layer improved according to the present invention.

<Low-refractive-index Layer>

The low-refractive-index layer is disposed above the high-refractive-index layer, as shown in FIGS. 1(*a*) and (*b*). The upper side of the low-refractive-index layer is a surface of the anti-reflection film.

In the present invention, the low-refractive-index layer is composed of a cured coating (film) of a copolymer that has a main chain consisting of carbon atoms and that comprises as essential constituents a fluorine-containing vinyl monomer polymerizing unit and a polymerizing unit having in its side chain a (meth)acryloyl group. A component originating from the copolymer occupies preferably 70 mass % or more, more preferably 80 mass % or more, and most preferably 90 mass % or more of the solid contents in the cured coating. An embodiment wherein a hardener such as polyfunctional (meth)acrylate is added, is not preferred in view of achieving both a low refractive index and a high hardness of the coating, and in view of the miscibility of the hardener with the copolymer.

The low-refractive-index layer has a refractive index preferably in the range of 1.20 to 1.49, more preferably in the range of 1.20 to 1.45, and especially preferably in the range of 1.20 to 1.44.

The low-refractive-index layer has a thickness preferably in the range of 50 to 400 nm, and more preferably in the range of 50 to 200 nm. The haze of the low-refractive-index layer is preferably 3% or less, more preferably 2% or less, and most preferably 1% or less. The practical mechanical strength of the low-refractive-index layer is preferably H or greater, more preferably 2H or greater, and most preferably 3H or greater, in terms of pencil grade according to the pencil hardness test under the load of 1 kg.

The following will explain the copolymer for use in the low-refractive-index layer in the present invention.

When the fluorine-containing vinyl monomer is polymerized, fluorine may position on the main chain or a side chain of the polymer. It is preferred that fluorine is positioned on the main chain.

Specific examples of the fluorine-containing vinyl monomer include, for example, fluoroolefins (for example, fluoroethylene, vinylidene fluoride, tetrafluoroethylene, hexafluoropropylene), partially or completely fluorinated alkyl ester derivatives of (meth)acrylic acid (for example, BISCOAT 6FM (trade name), manufactured by Osaka Organic Chemical Industry, Ltd., and M-2020 (trade name), manufactured by Daikin Industries, Ltd.), and completely or partially fluorinated vinyl ethers, and the like. Perfluoroolefins are preferred. Hexafluoropropylene is particularly preferred from the standpoints of the refractive index, solubility, transparency, availability and the like. If the composition ratio of such a fluorine-containing vinyl monomer is raised, the refractive index can be lowered but the mechanical strength of the coating falls. In the present invention, the fluorine-containing vinyl monomer is introduced in such a manner that the fluorine content of the copolymer would be preferably from 20 to 60 mass %, more preferably from 25 to 55 mass %, and most preferably from 30 to 50 mass %.

The copolymer in the present invention has, as an essential constituent, a polymerizing unit having, in its side chain, a (meth)acryloyl group. The method for introducing a (meth)acryloyl group into the copolymer is not particularly limited. Examples of the method include (1) a method of synthesizing a polymer having a nucleophilic group such as a hydroxyl group or an amino group, and subsequently reacting the polymer with (meth)acrylic chloride, (meth)acrylic anhydride, a mixed acid anhydride of (meth)acrylic acid and methanesulfonic acid, or the like, (2) a method of reacting (meth)acrylic acid with a polymer having a nucleophilic group as described above in the presence of a catalyst such as sulfuric acid, (3) a method of reacting a compound having both of an isocyanate group and a (meth)acryloyl group, such as methacryloyloxypropylisocyanate, with a polymer having a nucleophilic group as described above, (4) a method of synthesizing a polymer having an epoxy group and subsequently reacting it with (meth)acrylic acid, (5) a method of reacting a compound having both of an epoxy group and a (meth)acryloyl group, such as glycidyl methacrylate, with a polymer having a carboxyl group, and (6) a method of polymerizing a vinyl monomer having a 3-chloropropionic acid ester moiety and subsequently removing hydrogen chloride therefrom. Among these, it is particularly preferred that a (meth)acryloyl group is introduced into a polymer having a hydroxyl group by the method (1) or (2).

If the composition ratio of the (meth)acryloyl group-containing polymerizing unit is made high, mechanical strength of the coating improves but the refractive index also becomes high. The composition ratio can vary dependently on the kind of the fluorine-containing vinyl monomer polymerizing unit. In general, however, the (meth)acryloyl group-containing polymerizing unit occupies preferably 5 to 90 mass %, more preferably 30 to 70 mass %, and most preferably 40 to 60 mass % of the copolymer.

In the copolymer useful in the present invention, a vinyl monomer different from the above-mentioned fluorine-containing vinyl monomer polymerizing unit and the polymerizing unit having in its side chain a (meth)acryloyl group can be appropriately copolymerized with, considering from various standpoints, for example, adhesive properties to a support, Tg of the polymer (this contributes to hardness of the coating), solubility in a solvent, transparency, slipping property, and dust-proofing and stain-proofing properties. The different vinyl monomers may be used singly or in combination of two or more in accordance with a purpose. The total content by percentage of the introduced different vinyl monomers in the copolymer is preferably from 0 to 65 mol %, more preferably from 0 to 40 mol %, and most preferably from 0 to 30 mol %.

There is no particular limitation to the vinyl monomer unit that can be used in combination with the essential monomers, and the examples thereof include olefins (for example, ethylene, propylene, isoprene, vinyl chloride, and vinylidene chloride), acrylic acid esters (for example, methyl acrylate, ethyl acrylate, 2-ethylhexyl acrylate, 2-hydroxyethyl acrylate), methacrylic acid esters (for example, methyl methacrylate, ethyl methacrylate, butyl methacrylate, and 2-hydroxylethyl methacrylate), styrene derivatives (for example, styrene, p-hydroxymethyl styrene, p-methoxy stryrene), vinyl ethers (for example, methyl vinyl ether, ethyl vinyl ether, cyclohexyl vinyl ether, hydroxyethyl vinyl ether, hydroxybutyl vinyl ether), vinyl esters (for example, vinyl acetate, vinyl propionate, and vinyl cinnamate), unsaturated carboxylic acids (for example, acrylic acid, methacrylic acid, crotonic acid, maleic acid, itaconic acid), acrylamides (for example, N,N-dimethylacrylamide, N-tert-butylacrylamide, N-cyclohexylacrylamide), methacrylamides (N,N-dimethylmethacrylamide), and acrylonitriles.

A preferred form of the copolymer for use in the present invention is represented by the above-mentioned formula 1. In the formula 1, L represents a linking group having 1 to 10 carbon atoms, preferably 1 to 6 carbon atoms, and particularly preferably 2 to 4 carbon atoms, the linking group may have a linear, branched or cyclic structure, and it may contain one or more hetero atoms selected from O, N and S.

Preferred examples thereof include $*—(CH_2)_2—O—**$, $*—(CH_2)_2—NH—**$, $*—(CH_2)_4—O—**$, $*—(CH_2)_6—O—**$, $*—(CH_2)_2—O—(CH_2)_2—O—**$, $*—CONH—(CH_2)_3—O—**$, $*—CH_2CH(OH)CH_2—O—**$, and $*—CH_2CH_2OCONH(CH_2)_3—O—**$ wherein * indicates a linking site to the side of the polymer main chain, and ** indicates a linking site to the side of the (meth)acryloyl group, m is 0 or 1.

In the formula 1, X represents a hydrogen atom or a methyl group. From the standpoint of the hardening reactivity, X is preferably a hydrogen atom.

In the formula 1, A represents a polymerizing unit of any vinyl monomer, and there is no particular limitation, as long as it is a monomer constituent which can be copolymerized with hexafluoropropylene. A can be appropriately selected, from various standpoints, for example, adhesive properties to the support, Tg of the polymer (this contributes to hardness of the coating), solubility in a solvent, transparency, slipping property, dust-proofing and stain-proofing properties. In accordance with a purpose, A may be composed of a single vinyl monomer or plural vinyl monomers.

Preferred examples thereof include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, allyl vinyl ether; vinyl esters such as vinyl acetate, vinyl propionate, and vinyl butyrate; (meth)acrylates such as methyl (meth)acrylate, ethyl (meth)acrylate, hydroxyethyl (meth)acrylate, glycidyl methacrylate, allyl (meth)acrylate, (meth)acryloyloxypropyltrimethoxysilane; styrene and styrene derivatives such as p-hydroxymethylstyrene; unsaturated carboxylic acids such as crotonic acid, maleic acid and itaconic acid, and derivatives thereof. Preferred are vinyl ether derivatives, and vinyl ester derivatives. Particularly preferred are vinyl ether derivatives.

x, y and z represent mol % of the respective constituents, and are values satisfying $30 \leqq x \leqq 60$, $5 \leqq y \leqq 70$ and $0 \leqq z \leqq 65$, preferably $35 \leqq x \leqq 55$, $30 \leqq y \leqq 60$ and $0 \leqq z \leqq 20$, and particularly preferably $40 \leqq x \leqq 55$, $40 \leqq y \leqq 55$ and $0 \leqq z \leqq 10$.

A particularly preferred form of the copolymer for use in the present invention is represented by the formula 2. In the formula 2, X, x and y each has the same meaning and the same preferred scope as those in the formula 1.

n is an integer of $2 \leqq n \leqq 10$, preferably $2 \leqq n \leqq 6$, and particularly preferably $2 \leqq n \leqq 4$.

B represents a polymerizing unit of any vinyl monomer, and may be composed of a single component or plural components. Examples thereof are the same as described as examples of A in the formula 1.

z1 and z2 represent mol % of the respective constituents, and are values satisfying $0 \leqq z1 \leqq 65$ and $0 \leqq z2 \leqq 65$, preferably $0 \leqq z1 \leqq 30$ and $0 \leqq z2 \leqq 10$, and particularly preferably $0 \leqq z1 \leqq 10$ and $0 \leqq z2 \leqq 5$.

The copolymer represented by the formula 1 or 2 can be synthesized, for example, by introducing a (meth)acryloyl group into a copolymer comprising a hexafluoropropylene component and a hydroxyalkyl vinyl ether component, according to any one of the above-mentioned methods.

Hereinafter, preferable examples of the copolymer useful in the present invention are shown below, but the present invention is not limited to these.

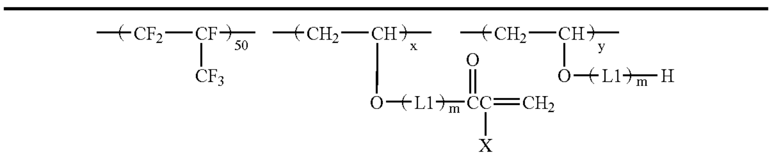

| | x | y | m | L1 | X |
|---|---|---|---|---|---|
| P-1 | 50 | 0 | 1 | $*—CH_2CH_2O—**$ | H |
| P-2 | 50 | 0 | 1 | $*—CH_2CH_2O—**$ | $CH_3$ |
| P-3 | 45 | 5 | 1 | $*—CH_2CH_2O—**$ | H |
| P-4 | 40 | 10 | 1 | $*—CH_2CH_2O—**$ | H |
| P-5 | 30 | 20 | 1 | $*—CH_2CH_2O—**$ | H |
| P-6 | 20 | 30 | 1 | $*—CH_2CH_2O—**$ | H |
| P-7 | 50 | 0 | 0 | — | H |
| P-8 | 50 | 0 | 1 | $*—C_4H_8O—**$ | H |
| P-9 | 50 | 0 | 1 | $*—(CH_2)_2—O—(CH_2)_2—O—**$ | H |
| P-10 | 50 | 0 | 1 | 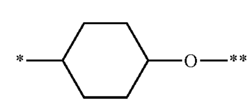 | H |
| P-11 | 50 | 0 | 1 | $*—CH_2CH_2NH—**$ | H |

-continued

| | | | | | |
|---|---|---|---|---|---|
| P-12 | 50 | 0 | 1 | $*—CH_2CH_2OC(=O)NHCH_2CH_2CH_2O—**$ | H |
| P-13 | 50 | 0 | 1 | $*—CH_2CH_2OC(=O)NHCH_2CH_2CH_2O—**$ | $CH_3$ |
| P-14 | 50 | 0 | 1 | $*—CH_2CH_2CH_2CH_2OC(=O)NHCH_2CH_2CH_2O—**$ | $CH_3$ |
| P-15 | 50 | 0 | 1 | $*—CH_2CH(OH)CH_2O—**$ | H |
| P-16 | 50 | 0 | 1 | $*—CH_2CH(CH_2OH)O—**$ | H |
| P-17 | 50 | 0 | 1 | $*—CH_2CH_2OCH_2—CH(OH)CH_2O—**$ | H |
| P-18 | 50 | 0 | 1 | $*—CH_2OCH_2CH(OH)—CH_2O—**$ | $CH_3$ |
| P-19 | 50 | 0 | 1 | $*—CH_2OCH_2CH(CH_2OH)—O—**$ | $CH_3$ |
| P-20 | 40 | 10 | 1 | $*—CH_2CH_2O—**$ | $CH_3$ |

*indicates polymer-main-chain side,
**indicates (meth)acryloyl group side or hydrogen side

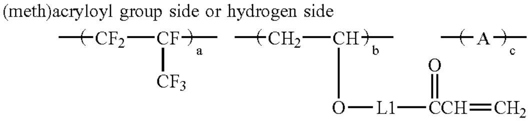

| | a | b | c | L1 | A |
|---|---|---|---|---|---|
| P-21 | 55 | 45 | 0 | $*—CH_2CH_2O—**$ | — |
| P-22 | 45 | 55 | 0 | $*—CH_2CH_2O—**$ | — |
| P-23 | 50 | 45 | 5 | $*—CH_2CH_2OC(=O)NHCH_2CH_2CH_2O—**$ | $—CH_2—CH(OCH_2CH_2OH)—$ |
| P-24 | 50 | 45 | 5 | $*—CH_2CH(OH)—CH_2O—**$ | 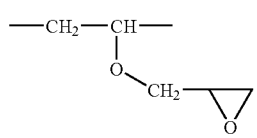 |
| P-25 | 50 | 45 | 5 | $*—CH_2CH(CH_2OH)O—**$ | 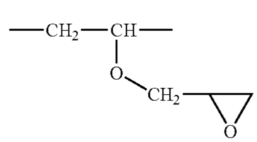 |
| P-26 | 50 | 40 | 10 | $*—CH_2CH_2O—**$ | $—CH_2—CH(OCH_2CH_3)—$ |
| P-27 | 50 | 40 | 10 | $*—CH_2CH_2O—**$ | 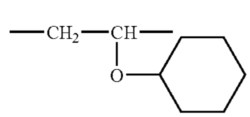 |

-continued
| | | | | | |
|---|---|---|---|---|---|
| P-28 | 50 | 40 | 10 | *—$CH_2CH_2O$—** | 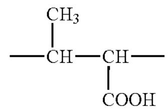 |
*indicates polymer-main-chain side,
**indicates (meth)acryloyl group side
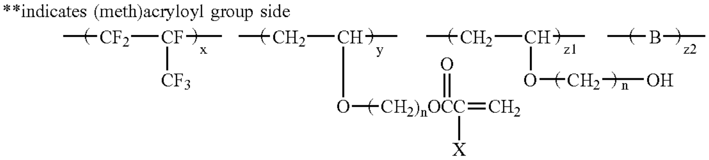
| | x | y | z1 | z2 | n | X | B |
|---|---|---|---|---|---|---|---|
| P-29 | 50 | 40 | 5 | 5 | 2 | H | 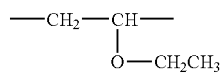 |
| P-30 | 50 | 35 | 5 | 10 | 2 | H | 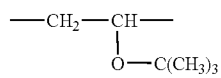 |
| P-31 | 40 | 40 | 10 | 10 | 4 | $CH_3$ | 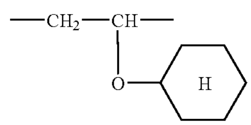 |
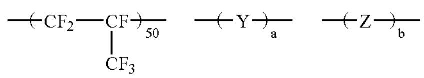
| | a | b | Y | Z |
|---|---|---|---|---|
| P-32 | 45 | 5 | 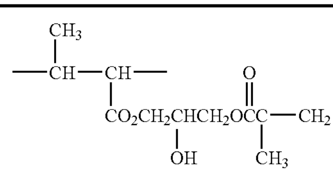 | 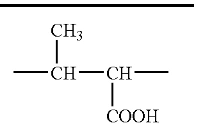 |
| P-33 | 40 | 10 | 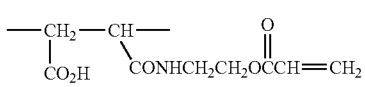 | 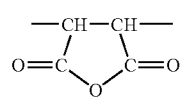 |
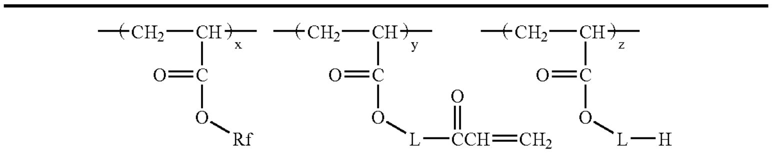
| | x | y | z | Rf | L |
|---|---|---|---|---|---|
| P-34 | 60 | 40 | 0 | —$CH_2CH_2C_8F_{17}$-n | *—$CH_2CH_2O$—** |
| P-35 | 60 | 30 | 10 | —$CH_2CH_2C_4F_8H$-n | *—$CH_2CH_2O$—** |
| P-36 | 40 | 60 | 0 | —$CH_2CH_2C_6F_{12}H$ | *—$CH_2CH_2CH_2CH_2O$—** |
*indicates polymer-main-chain side,
**indicates (meth)acryloyl group side or hydrogen side
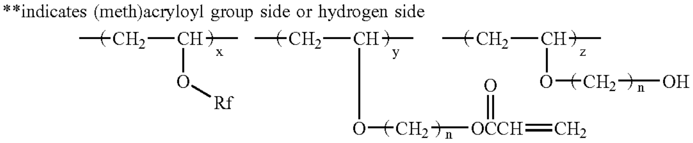
| | x | y | z | n | Rf |
|---|---|---|---|---|---|
| P-37 | 50 | 50 | 0 | 2 | —$CH_2C_4F_8H$-n |
| P-38 | 40 | 55 | 5 | 2 | —$CH_2C_4F_8H$-n |

-continued

| | | | | | |
|---|---|---|---|---|---|
| P-39 | 30 | 70 | 0 | 4 | $—CH_2C_8F_{17}$-n |
| P-40 | 60 | 40 | 0 | 2 | $—CH_2CH_2C_8F_{16}H$-n |

The copolymer for use in the present invention can be synthesized by synthesizing a precursor, such as a hydroxyl group-containing polymer, by any one of various polymerization methods, such as solution polymerization, precipitation polymerization, suspension polymerization, bulk polymerization and emulsion polymerization, and then introducing a (meth)acryloyl group into the precursor by the above-mentioned macromolecular reaction. The polymerization reaction can be conducted in a known operation, such as a batch process, a semi-continuous process or a continuous process.

As a method of initiating polymerization, known are a method of using a radical initiator, a method of irradiating light or radiation, and the like. These polymerization methods and methods of initiating polymerization are described in, for example, "Kobunshi Gosei Hoho" by Teiji Turuta, Revised Edition (published by Nikkankogyo Shimbunsha, 1971) and "Kobunshi Gosei no Jikkenho" coauthored by Takayuki Ohtu and Masaetsu Kinoshita (published by Kagakudojin, 1972), pp. 124 to 154.

Among these polymerization methods, solution polymerization in which a radical initiator is used is particularly preferable. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetoamide, benzene, toluene, acetonitrile, methylenechloride, chloroform, dichloroethane, methanol, ethanol, 1-propanol, 2-propanol and 1-butanol. These solvents may be used singly or in a combination of at least 2 kinds of solvents, or alternatively as a mixed solvent with water.

Polymerization temperature needs to be selected in relation to the molecular mass of a polymer to be formed, kinds of an initiator and the like. Polymerization can be performed in a wide range of from 0° C. or lower to 100° C. or higher, but it is preferably performed in the range of from 50° C. to 100° C.

Reaction pressure may be arbitrary selected, but it is generally in the range of 1 to 100 kg/cm$^2$, and particularly preferably, it is approximately in the range of 1 to 30 kg/cm$^2$. Reaction time is approximately in the range of 5 to 30 hours in general.

As a re-precipitation solvent for the thus-obtained polymer, 2-propanol, hexane, methanol, or the like is preferable.

The low-refractive-index layer forming composition in the present invention is usually in a liquid form; it comprises the above-mentioned copolymer as an essential constituent; and it is prepared by dissolving the essential constituent, together with various additives and a radical polymerization initiator if necessary, into a suitable solvent. The concentration of solid contents at this time, which may be appropriately selected in accordance with a purpose, is generally from about 0.01 to 60 mass %, preferably from about 0.5 to 50 mass %, and most preferably from 1 to 20 mass %.

As described above, it is not necessarily advantageous to add additives such as a hardener to the composition, in view of the coating hardness of the low-refractive-index layer. It may be however allowable to add, to the composition, a small amount of a hardener, such as a polyfunctional (meth) acrylate compound, a polyfunctional epoxy compound, a polyisocyanate compound, an aminoplast, a polybasic acid or anhydride thereof, or a small amount of inorganic fine particles such as silica particles, from the standpoint of the interfacial adhesive properties to a high-refractive-index layer. When these additives are added, the content thereof in all the solid contents of the low-refractive-index layer coating is preferably from 0 to 30 mass %, more preferably from 0 to 20 mass %, and most preferably from 0 to 10 mass %.

In order to give properties such as stain-proofing, water resistance, chemical resistance and slipping property, a known silicone-series or fluorine-series stain-proof agent, a slipping agent, or some other agent may be appropriately added to the composition. When these additives are added, the content thereof in all the solid contents of the low-refractive-index layer is preferably from 0 to 20 mass %, more preferably from 0 to 10 mass %, and most preferably from 0 to 5 mass %.

The radical polymerization initiator may be any one of a compound that generates radicals by the action of heat, and a compound that generates radicals by the action of light.

As the compound that initiates radical polymerization by the action of heat, for example, organic or inorganic peroxides, and organic azo or diazo compounds may be used.

Specific examples of the above-mentioned compounds include organic peroxides such as benzoyl peroxide, benzoyl halogenoperoxide, lauroyl peroxide, acetyl peroxide, dibutyl peroxide, cumene hydroperoxide, and butyl hydroperoxide; inorganic peroxides such as hydrogen peroxide, ammonium persulfate, and potassium persulfate; azo compounds such as 2-azobis(isobutylonitrile), 2-azobis(propionitrile), and 2-azobis(cyclohexanedinitrile); and diazo compounds such as diazoaminobenzene and p-nitrobenzene diazonium.

When the compound that initiates radical polymerization by the action of light is used, the coating is hardened by the irradiation of active energy rays.

Examples of these photo-radical polymerization initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds. Examples of the acetophenones include 2,2-diethoxyacetophenone, p-dimethylacetophenone, 1-hydroxydimethylphenylketone, 1-hydroxycyclohexyl phenylketone, 2-methyl-4-methylthio-2-morpholinopropiophenone and 2-benzyl-2-dimetylamino-1-(4-morpholinophenyl)butanone. Examples of the benzoines include benzoine benzenesulfonic acid ester, benzoine toluenesulfonic acid ester, benzoine methylether, benzoine ethylether, and benzoine isopropylether. Examples of the benzophenones include benzophenone, 2,4-dichloro benzophenone, 4,4-dichlorobenzophenone, and p-chlorobenzophenone. Examples of the phosphine oxides include 2,4,6-trimethylbenzoyldiphenylphosphine oxide. A sensitizing dye may be also preferably used in combination with these photo-radical polymerization initiators.

The compound that initiates radical polymerization by the action of heat or light is added in an amount enough to initiate the polymerization of a carbon-carbon double bond. Generally, the addition amount of said compound is preferably in the range of 0.1 to 15 mass %, more preferably in the range of 0.5 to 10 mass %, and particularly preferably in the range of 2 to 5 mass %, based on the total solid content in the low-refractive-index-layer-forming composition.

A solvent to be included in the low-refractive-index-layer coating composition is not particularly limited so long as the composition containing the fluorine-containing copolymer is homogeneously dissolved or dispersed in the solvent, without causing precipitation of the same. Two or more kinds of solvents may be used in combination. Preferable examples of the solvent include ketones (e.g., acetone, methylethyl ketone, methylisobutyl ketone), esters (e.g., ethyl acetate, butyl acetate), ethers (e.g., tetrahydrofuran, 1,4-dioxane), alcohols (e.g., methanol, ethanol, isopropyl alcohol, butanol, ethyleneglycol), aromatic hydrocarbons (e.g., toluene, xylene), and water.

In addition, various kinds of additives such as silane coupling agents, surfactants, thickeners, and leveling agents may be optionally added to the low-refractive-index-layer-forming composition, if necessary.

<High- and Middle-refractive-index Layers>

In case where the anti-reflection film of the present invention has a form of a multi-layer film, the low-refractive-index layer is generally used together with at least one layer having a higher refractive index than the low-refractive-index layer (i.e., the above-mentioned high-refractive-index layer and/or middle-refractive-index layer).

Examples of the organic material usable to form the above-mentioned layer that has a higher refractive index than the low-refractive-index layer include a thermoplastic film (e.g., polystyrenes, polystyrene copolymers, polycarbonates, polymers having an aromatic ring, heterocyclic ring or alicyclic group excluding polystyrenes; and polymers having a halogen atom excluding a fluorine atom); a thermal film-forming composition (e.g., film-forming compositions in which melamines, phenols or epoxies are used as a hardener); urethane-forming compositions (e.g., a combination of alicyclic or aromatic isocyanate and polyol), and radical polymerizable compositions (compositions containing a modified film or pre-polymer in which a double bond is introduced into the above-mentioned compounds (polymers and the like) so that a radical curing can be performed). Materials having a high film-forming property are preferable. In the layer having a higher refractive index than the above-mentioned layer, inorganic fine particles dispersed in an organic material may be also used. In this case, because inorganic fine particles generally have a high refractive index, even an organic material having a relatively lower refractive index, when compared with the case where an organic material is used alone, also can be used in the above-said layer. Examples of these materials include, in addition to the above-mentioned organic materials, various kinds of transparent organic materials that are able to form a stable dispersion of inorganic fine particles, such as vinyl-series copolymers including acryl-series copolymers, polyesters, alkyd films, fibrous polymers, urethane films, various kinds of hardeners that are able to harden these materials, and compositions having a hardening functional group.

Further, silicon-series compounds substituted with an organic substituent may be included in the above-mentioned organic materials. Examples of these silicon-series compounds are those represented by the following formula, or hydrolytic products thereof:

$$R^a_m R^b_n SiZ_{(4-m-n)}$$

In which $R^a$ and $R^b$ each represents an alkyl group, an alkenyl group, an allyl group, or a hydrocarbon group substituted with halogen, epoxy, amino, mercapto, methacryloyl or cyano; Z represents a hydrolysable group selected from the group consisting of an alkoxyl group, an alkoxyalkoxyl group, a halogen atom and an acyloxy group; m and n each represents 0, 1 or 2, providing that m+n=1 or 2.

Preferable examples of the inorganic compound of the inorganic fine particles to be dispersed in the above-mentioned organic material include oxides of metallic element such as aluminum, titanium, zirconium and antimony. These compounds are sold at a market in the form of fine particles, namely powder, or a colloidal dispersion of the fine particles in water and/or other solvent. These fine particles are used with being further mixed and dispersed in the above-mentioned organic material or organic silicon compound.

As the material that forms a layer having a higher refractive index than the above-mentioned materials, film-forming inorganic materials that can be dispersed in a solvent, or that are themselves liquid form (e.g., alkoxides of various elements, organic acid salts, coordination compounds bonding with a coordinating compound (e.g., chelate compounds), and inorganic polymers) are enumerated. Preferable examples of these compounds include metal alkolate compounds such as titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-propoxide, zirconium tetra-n-propoxide, zirconium tetra-n-butoxide, zirconium tetra-sec-butoxide and zirconium tetra-tert-butoxide; chelate compounds such as diisopropoxy titanium bis(acetylacetonate), dibutoxy titanium bis(acetylacetonate), diethoxy titanium bis(acetylacetonate), bis (acetylacetone zirconium), aluminum acetylacetonate, aluminum di-n-butoxide monoethylacetoacetate, aluminum di-i-propoxide monomethylacetoacetate and tri-n-butoxide zirconium monoethylacetoacetate; and inorganic polymers comprising carbon zirconyl ammonium or zirconium as a main component. In addition to the above-mentioned compounds, various kinds of alkyl silicates or hydrolytic product thereof, and silica in the form of fine particles (particularly a colloidal dispersion of silica gel) also may be used as an additional material that can be used in combination with the above-mentioned compounds, even though such material has relatively a low refractive index.

The refractive index of the high-refractive-index layer is generally 1.70 to 2.20. The refractive index can be measured by a measurement using an Abbe's refractometer, or by estimation based on the reflectance of light from a layer surface. The high-refractive-index layer has a thickness preferably in the range of 5 nm to 10 μm, more preferably in the range of 10 nm to 1 μm, most preferably in the range of 30 nm to 0.5 μm. The haze of the high-refractive-index layer is preferably 5% or less, and more preferably 3% or less, and most preferably 1% or less. Specifically, the mechanical strength of the high-refractive-index layer is preferably H or harder, and more preferably 2H or harder, and most preferably 3H or harder, in terms of pencil hardness grades under 1 kg load.

The refractive index of the middle-refractive-index layer is adjusted so as to be a value (magnitude) between the refractive index of the low-refractive-index layer and the refractive index of the high-refractive-index layer. The refractive index of the middle-refractive-index layer is preferably in the range of 1.50 to 1.70.

It is particularly preferable that inorganic fine particles and a polymer are used in the high-refractive-index layer, and that the middle-refractive-index layer is formed with adjusting so that the refractive index of the middle-refractive-index layer becomes lower than that of the high-refractive-index layer. A haze of the middle-refractive-index layer is preferably 3% or less.

<Other Layers>

The anti-reflection film may be further provided with a hard coat layer, a moisture-proof layer, an anti-static layer, an undercoating layer and a protective layer. The hard coat layer is provided to give a scratch resistance to a transparent support. The hard coat layer also has a function to strengthen adhesion between the transparent support and a layer provided thereon. The hard coat layer may be formed using acryl-series polymers, urethane-series polymers, epoxy-series polymers, silicon-series polymers, and/or silica-series compounds. A pigment may be added to the hard coat layer. The acryl-series polymers are preferably synthesized by a polymerization reaction of multi-functional acrylate monomers (for example, polyol acrylate, polyester acrylate, urethane acrylate, epoxy acrylate). Examples of the urethane-series polymers include melamine polyurethane. As the silicon-series polymers, co-hydrolysis products of a silane compound (e.g., tetraalkoxysilane, alkyltrialkoxysilane) and a silane-coupling agent having a reactive group (e.g., epoxy, methacryl) are preferably used. Two or more kinds of polymers may be used in combination. As the silica-series compounds, colloidal silica is preferably used. The mechanical strength of the hard coat layer is preferably H or harder, more preferably 2H or harder, and most preferably 3H or harder, in terms of pencil grades per 1 kg of load. On the transparent support, an adhesive layer, a shield layer, a slide layer and an anti-static layer may be provided, in addition to the hard coat layer. The shield layer is provided to shield electromagnetic waves and/or infrared radiation.

<Transparent Support>

The anti-reflection film preferably may have a transparent support, but for the case where the anti-reflection film is directly placed on the surface of a CRT image display or of lens. As the transparent support, a plastic film is more preferably used than a glass plate (sheet). Examples of materials to form the plastic film include cellulose esters (e.g., triacetyl cellulose, diacetyl cellulose, propionyl cellulose, butyryl cellulose, acetylpropionyl cellulose, and nitro cellulose), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g., syndiotactic polystyrene), polyolefins (e.g., polypropylene, polyethylene, and polymethylpentene), polysulfones, polyethersulfones, polyarylates, polyether imides, polymethylmethacrylates, and polyether ketones. Triacetyl cellulose, polycarbonate, polyethylene terephthalate and polyethylene naphthalate are preferred. The light transmittance of the transparent support is preferably 80% or more, and more preferably 86% or more. The haze of the transparent support is preferably 2.0% or less, and more preferably 1.0% or less. The refractive index of the transparent support is preferably in the range of 1.4 to 1.7. An infrared-ray absorbing agent or an ultra-violet-ray absorbing agent may be added to the transparent support. The amount of the infrared-ray absorbing agent to be added is preferably 0.01 to 20 mass % of the transparent support, and more preferably 0.05 to 10 mass %. Further, as a lubricant, particles of an inactive inorganic compound may be added to the transparent support. Examples of such an inorganic compound include $SiO_2$, $TiO_2$, $BaSO_4$, $CaCO_3$, talc and kaoline. The transparent support may be subjected to a surface treatment.

Examples of the surface treatment include a treatment by chemicals, a mechanical treatment, a corona discharge treatment, a flame treatment, a UV radiation treatment, a high-frequency treatment, a glow discharge treatment, an active plasma treatment, a laser treatment, a mixed-acid treatment, and an ozone-oxidation treatment. Among these examples, a glow discharge treatment, a UV radiation treatment, a corona discharge treatment and a flame treatment are preferable, and a glow discharge treatment and a UV radiation treatment are further more preferable.

<Formation of an Anti-reflection Film>

In the case where the anti-reflection film is composed of a single layer, or multi layers as described above, each layer may be formed by coating, in accordance with a dip coat process, an air-knife coat process, a curtain coat process, a roller coat process, a wire bar coat process, a gravure coat process, or an extrusion coat process (described in U.S. Pat. No. 2,681,294). Two or more layers may be coated at the same time. Such simultaneous coating method is described in U.S. Pat. Nos. 2,761,791, 2,941,898, 3,508,947, 3,526,528, and "Kotingu Kogaku (Coating Engineering)" by Yuji Harazaki, Asakura Shoten (1973), page 253.

The respective layers of the anti-reflection film of the present invention are cured by action of ionizing radiation and/or heat. It is preferred to irradiate the ionizing radiation, using a high-pressure mercury lamp. At this time, it is preferable to irradiate ultraviolet rays, for example, at an oxygen concentration of 0.5% or less, more preferably at an oxygen concentration of 0.3% or less, and most preferably at an oxygen concentration of 0.2% or less. It is sufficient that the radiated energy is a quantity necessary for advancing the curing reaction sufficiently. Specifically, the energy is preferably from 300 to 1500 $mJ/cm^2$, more preferably from 400 to 1000 $mJ/cm^2$, and most preferably from 500 to 800 $mJ/cm^2$.

When the heating is performed, the temperature range is preferably from about 30 to 200 ° C., more preferably from 80 to 180° C., and most preferably from 100 to 150° C. The heating time is preferably from 30 seconds to 100 hours, more preferably from 1 minute to 1 hour, and most preferably from 2 to 15 minutes.

It is preferable that the reflectance of the anti-reflection film is as low as possible. Specifically, the average mirror reflectance in the wavelength region of 450 to 650 nm is preferably 2% or less, more preferably 1% or less, and most preferably 0.7% or less. In the case where the anti-reflection film does not have an anti-glare function, which function will be described later, the haze of the anti-reflection film is preferably 3% or less, more preferably 1% or less, and most preferably 0.5% or less. The mechanical strength of the anti-reflection film is preferably H or harder, more preferably 2H or harder, and most preferably 3H or harder, in terms of pencil grades under 1 kg of load. The anti-reflection film may have an anti-glare function that enables to scatter external lights. The anti-glare function may be obtained by forming irregularities on a surface of the anti-reflection film. When fine particles are used in the low-refractive-index layer, irregularities owing to the fine particles are formed on the surface of the anti-reflection film. If the anti-glare function obtained by the fine particles is not enough, a small amount (for example, 0.1 to 50 mass %) of relatively large fine particles (for example, particle size: 50 nm to 200 nm) may be added to the low-refractive-index layer, the high-refractive-index layer, the middle-refractive-index layer, or the hard coat layer. In the case where the anti-reflection film has an anti-glare function, the haze of the anti-reflection film is preferably 3 to 30%, more preferably 5 to 20%, and most preferably 7 to 20%.

The anti-reflection film can be used in a polarizing plate or image display device such as a liquid crystal display device (LCD), a plasma display panel (PDP), an electroluminescence display (ELD), and a cathode-ray-tube display device (CRT). The anti-reflection film is disposed so that the high-refractive-index layer is placed at the side of the image displaying surface (screen) of an image display device. In the case where the anti-reflection film has the transparent support, the anti-reflection film is attached to the image display device so that the transparent support side of the film is adhered to the image displaying surface of the image display device.

The anti-reflection film may also be applied to case covers, optical lenses, lenses for glasses, window shields, light covers, and helmet shields.

The anti-reflection film of the present invention is a coating type suitable for mass production. The anti-reflection film of the present invention is also low in reflectance and is superior in scratch resistance. The anti-reflection film of the present invention also takes a form in which a transparent support is provided. The image display device of the present invention is superior in surface scratch resistance, and it is prevented from reflection sufficiently.

The anti-reflection film of the present invention has high anti-reflection performance and has excellent scratch resistance. The anti-reflection film of the present invention and image display devices to which the film is provided have excellent properties that reflection of external light is sufficiently prevented and they exhibit high scratch resistance.

The present invention is described in more detail with reference to the following examples, but the invention is not limited thereto.

EXAMPLES

Synthesis Examples

Synthesis of a Fluorine-containing Copolymer (P-1)

Into an autoclave made of stainless steel and provided with a stirrer and having an internal volume of 100 mL were charged 40 mL of ethyl acetate, 14.7 g of hydroxyethyl vinyl ether and 0.55 g of dilauroyl peroxide, and the interior of the autoclave was degassed and substituted with nitrogen gas. Furthermore, 25 g of hexafluoropropylene (HFP) was introduced into the autoclave, and the system was heated to 65° C. The pressure when the temperature inside the autoclave reached 65° C. was 5.4 kg/cm$^2$. With keeping the temperature, the reaction was continued for 8 hours. When the pressure reached 3.2 kg/cm$^2$, the heating was stopped and the system was allowed to cool. When the inner temperature fell to room temperature, unreacted monomers were expelled and the autoclave was opened to take out the reaction solution. The resultant reaction solution was poured into a large excess of hexane. The solvent was removed by decantation, to take out a precipitated polymer. Furthermore, the resultant polymer was dissolved into a small amount of ethyl acetate and re-precipitated from hexane two times, so as to remove remaining monomers completely. After the resultant was dried, 28 g of the following copolymer (a-1) of hexafluoropropylene and hydroxyethyl vinyl ether (mole ratio, 1:1) was obtained. The refractive index of the resultant polymer was 1.406. Next, 20 g of the polymer was dissolved into 100 mL of N,N-dimethylacetoamide, and then 11.4 g of acrylic acid chloride was added dropwise to the solution while the solution was cooled with ice. Thereafter, the solution was stirred at room temperature for 10 hours. Ethyl acetate was added to the reaction solution, and the resultant solution was washed with water. The organic phase was extracted and concentrated. The resultant polymer was re-precipitated from hexane, to obtain 19 g of a fluorine-containing copolymer (P-1). The number-average molecular mass of the resultant polymer was 31,000, and the refractive index thereof was 1.421.

a-1

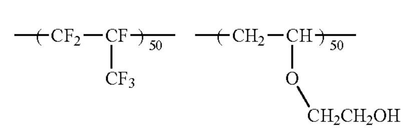

Synthesis of a Fluorine-containing Copolymer (P-15)

Into a stainless steel autoclave provided with a stirrer and having an internal volume of 100 mL were charged 30 mL of ethyl acetate, 11.5 g of glycidyl vinyl ether and 0.42 g of dilauroyl peroxide, and the interior of the autoclave was degassed and substituted with nitrogen gas. Furthermore, 21 g of hexafluoropropylene (HFP) was introduced into the autoclave, and the system was heated to 65° C. The pressure when the temperature inside the autoclave reached 65° C. was 6.2 kg/cm$^2$. With keeping the temperature, the reaction was continued for 8 hours. When the pressure reached 3.6 kg/cm$^2$, the heating was stopped and the system was allowed to cool. When the inner temperature fell to room temperature, unreacted monomers were expelled and the autoclave was opened to take out the reaction solution. The resultant reaction solution was poured into a large excess of hexane. The solvent was removed by decantation, to take out a precipitated polymer. Furthermore, this resulted polymer was dissolved into a small amount of ethyl acetate and re-precipitated from hexane two times, so as to remove the remaining monomers completely. After the resultant was dried, 21 g of a copolymer of hexafluoropropylene and glycidyl vinyl ether was yielded. Next, into 30 g of methyl isobutyl ketone were dissolved 15 g of the polymer, 10.6 g of acrylic acid, 0.13 g of benzyltriethylammonium chloride, and 84 mg of Irganox 1010 (trade name, manufactured by Ciba Geigy, a polymerization inhibitor), and the solution was heated at 100° C. for 5 hours. The reaction solution was poured into a large excess of hexane, to take out a precipitated polymer. Further, this polymer was dissolved into a small amount of ethyl acetate and re-precipitated from hexane two times, so as to remove the remaining monomers completely. In this way, 20 g of a fluorine-containing copolymer (P-15) was yielded.

The number-average molecular mass of the resultant polymer was 28,000 and the refractive index thereof was 1.425.

Synthesis of a Fluorine-containing Copolymer (P-13)

Into 28 g of methyl isobutyl ketone were dissolved 15.5 g of the copolymer (a-1) of hexafluoropropylene and hydroxypropyl vinyl ether described in Synthesis Example of the fluorine-containing copolymer (P-1), 12.1 g of methacryloyloxypropylisocyanate and 25 mg of dibutyl tin dilaurate. The solution was stirred at 50° C. for 4 hours. The reaction solution was poured into a large excess of hexane, to take out a precipitated polymer. Furthermore, this resultant polymer was dissolved into a small amount of ethyl acetate and re-precipitated from hexane two times, so as to remove the remaining monomers completely. In this way, 19 g of a fluorine-containing copolymer (P-13) was obtained. The number-average molecular mass of the resultant polymer was 32,000 and the refractive index thereof was 1.430.

Other polymers according to the present invention were prepared in a similar manner as shown in the above. Synthesis of a compound a-2 for comparison Into an autoclave made of stainless steel and provided with a stirrer and having an internal volume of 100 mL were charged 40 mL of ethyl acetate, 3.7 g of hydroxy ethyl vinyl ether, 12.0 g of ethyl vinyl ether, and 0.55 g of dilauroyl peroxide, and the interior of the autoclave was degassed and substituted with nitrogen gas under cooling with dry ice and methanol. Furthermore, 25 g of hexafluoropropylene (HFP) was introduced into the autoclave, and the system was heated to 65° C. The pressure when the temperature inside the autoclave reached 65° C. was 5.1 kg/cm$^2$. With keeping the temperature, the reaction was continued for 8 hours. When the pressure reached 2.9 kg/cm$^2$, the heating was stopped and the system was allowed to cool. When the inner temperature fell to room temperature, unreacted monomers were expelled and the autoclave was opened to take out the reaction solution. The resultant reaction solution was poured into a large excess of methanol. The solvent was removed by decantation, to take out a precipitated polymer. Further, this polymer was dissolved into a small amount of ethyl acetate and re-precipitated from methanol two times, so as to remove the remaining monomers completely. After the resultant was dried, 32 g of the following copolymer for comparison (a-2) was obtained (the ratio of each of the component is shown in molar ratio). The refractive index of the thus-obtained polymer was 1.385.

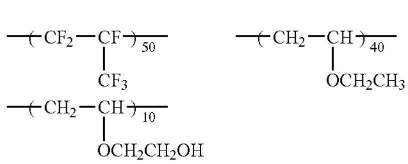

a-2

Example 1

Preparation of Anti-reflection Films (Single Layered Films)

Each of copolymers according to the present invention (P-1, P-4, and P-5) and mixtures of Comparative compound (a-1) and DPHA (dipentaerythritol hexaacrylate, manufactured by Nippon Kayaku Co., Ltd.) (three types with a mass ratio of 9/1, 8/2, and 7/3 respectively) was individually dissolved in methyl isobutyl ketone so that a concentration of the dissolved component became 30 mass %. Thereto was added a photo radical generator Irgacure 907 (trade name, manufactured by Ciba Geigy), so as to obtain a solution in which the generator was added to be 5 mass % of solid contents. Each of the coating forming compositions was individually coated onto a glass substrate and dried. Thereafter, ultraviolet rays having an energy of 750 mJ/cm$^2$ were radiated thereon at an oxygen concentration of 0.1%, so as to form a cured coating having a thickness of about 20 μm. In this way, anti-reflection film samples were obtained (Example-1 to Example-3 and Comparative Example-1 to Comparative Example-3).

Each of mixtures of the comparative compound (a-1) and CYMEL 303 (trade name, manufactured by Mitsui Cytec, Ltd., methylol-modified melamine) (three types with a mass ratio of 9/1, 8/2 and 7/3 respectively) was individually dissolved in methyl isobutyl ketone, so that the concentration of the dissolved component became 30 mass %. Thereto was added para-toluenesulfonic acid monohydrate, so as to yield a solution in which this compound was added to be 2 mass % of solid contents. Each of the coating forming compositions was individually coated onto a glass substrate, dried, and heated at 120° C. for 10 minutes, so as to form a cured coating having a thickness of about 20 μm. In this way, anti-reflection film samples were formed (Comparative Example-4 to Comparative Example-6).

The hardness of coating of these anti-reflection film samples was measured with a micro-hardness tester (Fischer scope H100VP-HCU (trade name), manufactured by Fischer Instrument Co.). At this time, a quadrangular weight-loaded indenting tool (a head angle between the opposite faces: 136°) made of diamond was used. A forced depth under a suitable test load was measured within the range of the forced depth of not more than 1 μm. The value of universal hardness is represented by a value of a test load divided by the surface area that is calculated from the geometrical shape of pressure marks formed under the test load.

The values of universal hardness (HU) of coating of each sample and the refractive indices of each cured coating (measured by means of the Abbe's refractometer (manufactured by ATAGO CO., LTD) at 20° C.) are shown in Table 1.

TABLE 1

| Sample | Fluorine-containing copolymer | Values of universal hardness (N/mm) | Hardened film's Refractive Index |
|---|---|---|---|
| Example-1 | P-1 | 172 | 1.433 |
| Example-2 | P-4 | 148 | 1.430 |
| Example-3 | P-5 | 124 | 1.427 |
| Comparative example-1 | a-1 + DPHA (9/1) | 38 | 1.428 |
| Comparative example-2 | a-1 + DPHA (8/2) | 68 | 1.440 |
| Comparative example-3 | a-1 + DPHA (7/3) | 92 | 1.453 |
| Comparative example-4 | a-1 + CYMEL303 (9/1) | 21 | 1.425 |
| Comparative example-5 | a-1 + CYMEL303 (8/2) | 48 | 1.437 |
| Comparative example-6 | a-1 + CYMEL303 (7/3) | 72 | 1.452 |

It is understood that the anti-reflection film samples of the present invention (Example-1 to Example-3), which were formed using the Polymers P-1, 4 or 5 introduced with an acryloyl group, were superior from the standpoint of achieving both high hardness and low refractive index compatibly, compared with Comparative Example-1 to Comparative Example-6 of modes where the hardener was mixed with the comparative polymer (a-1).

Example 2

Preparation of Anti-reflection Films (Multi-layered Films)

Respective components shown in Table 2 described below were mixed, and each mixture was dissolved into methyl isobutyl ketone. Thereafter, the solution was filtrated with a polypropylene filter having a pore size of 1 μm, so as to prepare a low-refractive-index layer coating solution.

In the table, DPHA (trade name) refers to dipentaerythritol hexaacrylate manufactured by Nippon Kayaku Co., Ltd.; CYMEL 303 (trade name) refers to methylol-modified melamine manufactured by Mitsui Cytec Ltd.; IRG 907 refers to a radical polymerization initiator Irgacure 907 (trade name), manufactured by Ciba-Geigy; DETX refers to a photosensitizing agent Kayacure DETX (trade name) manufactured by Nippon Kayaku Co., Ltd.

Figures in parentheses represent the content of each ingredient in terms of mass part.

TABLE 2

| Coating solution | Fluorine-containing polymer | Hardener | Catalyst to cure |
|---|---|---|---|
| Ln1 (This invention) | P-1 (100) | | IRG907 (5) |
| Ln2 (This invention) | P-1 (100) | | IRG907 (5)<br>DETX (2) |
| Ln3 (This invention) | P-2 (100) | | IRG907 (5) |
| Ln4 (This invention) | P-3 (100) | | IRG907 (5) |
| Ln5 (This invention) | P-4 (100) | | IRG907 (5) |
| Ln6 (This invention) | P-5 (90) | DPHA (10) | IRG907 (5) |
| Ln7 (This invention) | P-8 (100) | | IRG907 (5) |
| Ln8 (This invention) | P-9 (100) | | IRG907 (5) |
| Ln9 (This invention) | P-13 (100) | | IRG907 (5) |
| Ln10 (This invention) | P-15 (100) | | IRG907 (5) |
| Ln11 (This invention) | P-23 (100) | | IIRG907 (5) |
| Ln12 (This invention) | P-34 (100) | | IRG907 (5) |
| Ln13 (This invention) | P-40 (70) | | IRG907 (5) |
| Ln14 (Comparative example) | a-1 (70) | DPHA (30) | IRG907 (5) |
| Ln15 (Comparative example) | a-1 (80) | DPHA (20) | IRG907 (5) |
| Ln16 (Comparative example) | a-2 (70) | DPHA (30) | IRG907 (5) |
| Ln17 (Comparative example) | a-2 (80) | DPHA (20) | IRG907 (5) |
| Ln18 (Comparative example) | a-1 (80) | CYMEL303 (20) | p-Toluene sulfonic acid (2) |
| Ln19 (Comparative example) | a-2 (80) | CYMEL303 (20) | p-Toluene sulfonic acid (2) |

Preparation of a Coating Solution for First Layer (Hard Coat Layer)

125 g of a mixture of dipentaerythritol pentaacrylate and dipentaerythritol hexaacrylate (DPHA (trade name), manufactured by Nippon Kayaku Co., Ltd.) and 125 g of urethane acrylate oligomer (UV-6300B (trade name), manufactured by The Nippon Synthetic Chemical Industry Co., Ltd.) were dissolved in 439 g of an industrial modified ethanol. To the resultant solution was added a solution in which 7.5 g of a photo-polymerization initiator (Irgacure 907 (trade name), manufactured by Chiba Geigy) and 5.0 g of a photosensitizer (Kayacure DETX (trade name), manufactured by Nippon Kayaku Co., Ltd.) were dissolved in 49 g of methyl ethyl ketone. After the resultant mixture was stirred, the mixture was filtered through a polypropylene filter having a 1-μm mesh, to prepare a coating solution for a hard coat layer.

Preparation of Titanium Dioxide Dispersion 30 mass parts of titanium dioxide fine particles having a core/shell structure (TTO-55B (Trade name), manufactured by Ishihara Sangyo Kaisha, Ltd.), 4.5 mass parts of an anionic diacrylate monomer (PM21 (trade name), manufactured by Nippon Kayaku Co., Ltd.), 0.3 mass part of a cationic methacrylate monomer (DMAEA (Trade name), manufactured by Kohjin Co., Ltd.), and 65.2 mass parts of methyl ethyl ketone were dispersed by means of a sand grinder, to prepare a dispersion of titanium dioxide. Preparation of a coating solution for second layer (middle-refractive-index layer)

0.14 g of a photo-polymerization initiator (Irgacure 907 (trade name), manufactured by Ciba-Geigy) and 0.04 g of a photo-sensitizer (Kayacure DETX (trade name), manufactured by Nippon Kayaku Co., Ltd.) were dissolved in 151.9 g of cyclohexanone and 37.0 g of methyl ethyl ketone. To the obtained solution, a mixture of 6.1 g of the above titanium dioxide dispersion and 2.4 g of a mixture of dipentaerythritol pentaacrylate and dipentaerythritol hexaacrylate (DPHA, manufactured by Nippon Kayaku Co., Ltd.) were added, and stirred at room temperature for 30 minutes. The solution was filtered through a filter having 1-μm mesh, to prepare a coating solution for a middle-refractive-index layer.

Preparation of a Coating Solution for Third Layer (High-refractive-index Layer)

0.06 g of a photo-polymerization initiator (Irgacure 907 (trade name), manufactured by Ciba-Geigy) and 0.02 g of a photo-sensitizer (Kayacure DETX (trade name), manufactured by Nippon Kayaku Co., Ltd.) were dissolved in 152.8 g of cyclohexanone and 37.2 g of methyl ethyl ketone. To the obtained solution, 13.13 g of the titanium dioxide dispersion, and 0.76 g of a mixture of dipentaerythritol pentaacrylate and dipentaerythritol hexaacrylate (DPHA (trade name), manufactured by Nippon Kayaku Co., Ltd.) were added, and stirred at room temperature for 30 minutes. The solution was filtered through 1-μm mesh filter, to prepare a coating solution for a high-refractive-index layer.

Preparation of Anti-reflection Films

On a triacetyl cellulose film (TAC-TD80U (trade name), manufactured by Fuji Photo Film Co., Ltd.) having 80 μm thickness, a gelatin-undercoating layer was provided. The above-described coating solution for a hard coat layer was applied on the gelatin-undercoating layer with a bar coater, and dried at 120° C. Thereafter, the film was irradiated with UV-rays at an irradiation dose of 500 mJ/cm$^2$ under a nitrogen atmosphere with an oxygen concentration of 0.1%, to harden the coating layer. Thus, a hard coat layer having 7.5-μm thickness was formed.

Then, the above-described coating liquid for a middle-refractive-index layer was applied on the hard coat layer with a bar coater, dried at 120° C., and irradiated with UV light under a nitrogen atmosphere to harden the coating layer. Thus, a middle-refractive-index layer (refractive index: 1.72, thickness: 81 nm) was formed. Then, the above-described coating solution for a high-refractive-index layer was applied on the middle-refractive-index layer with a bar coater, and dried at 120° C. Thereafter, the film was irradiated with UV-rays at an irradiation dose of 500 mJ/cm$^2$ under a nitrogen atmosphere with an oxygen concentration of 0.1%, to harden the coating layer. Thus, a high-refractive-index layer (refractive index: 1.92, thickness: 53 nm) was formed. Further, the coating solution for a low-refractive-index layer presented in the above Table 2 (one of Ln1 to Ln13 according to the present invention and Ln14 to Ln17 for comparison) was applied on the high-refractive-index layer with a bar coater so that a thickness of the low-refractive-index layer was 85 nm. The film was irradiated with UV light with an irradiation dose of 750 mJ/cm$^2$ under a nitrogen atmosphere with a concentration of oxygen 0.1%, to form a low-refractive-index layer. Similarly, the coating solution for a low-refractive-index layer (one of Ln18 and Ln19 for comparison) was applied on the high-refractive-index layer with a bar coater so that a thickness of the low-refractive-index layer was 85 nm. The film was dried at 120° C. for 10 minutes, to form a low-refractive-index layer.

Evaluation of Anti-reflection Films with Respect to their Properties

The thus-obtained films having coated 1st to 4th layers coated on the support (Examples (1) to (13) and Comparative examples (14) to (19)) were evaluated with respect to the following properties:

(1) Average Reflectance

A spectral reflectance at an incidence of 5 degrees in the wavelength of 380 nm to 780 nm was measured, with a spectrophotometer (manufactured by JASCO Corporation). The thus-obtained results are presented in terms of an average mirror reflectance in the wavelength of 450 nm to 650 nm.

(2) Evaluation of Pencil Hardness

The anti-reflection films were humidified under the conditions of the temperature 25° C. and the humidity 60% RH for 2 hours. Thereafter, pencil hardness was evaluated according to the evaluation method of the pencil hardness specified by JIS-K-5400.

(3) Scratch Resistance Test

#0000 steel wool under a loading condition of 200 g was reciprocated 10 times on the surface of the film. A state of scratch occurring at that time was observed and evaluated according to the following grades:

| | |
|---|---|
| No scratch was observed: | ⊚ |
| Scratches were slightly observed: | ○ |
| Small scratches were observed, and apparently noticeable: | Δ |
| Conspicuous scratches were observed: | X |

The results obtained are shown in Table 3.

TABLE 3

| Anti-reflection film sample | Low-refractive-index layer coating solution | Refractive Index of low-refractive-index layer | Average reflectance | Pencil hardness | Scratch resistance |
|---|---|---|---|---|---|
| Example (1) | Ln1 | 1.433 | 0.31 | 3H | ⊚ |
| Example (2) | Ln2 | 1.434 | 0.33 | 3H | ⊚ |
| Example (3) | Ln3 | 1.430 | 0.31 | 3H | ⊚ |

TABLE 3-continued

| Anti-reflection film sample | Low-refractive-index layer coating solution | Refractive Index of low-refractive-index layer | Average reflectance | Pencil hardness | Scratch resistance |
|---|---|---|---|---|---|
| Example (4) | Ln4 | 1.430 | 0.30 | 3H | ⊚ |
| Example (5) | Ln5 | 1.428 | 0.29 | 3H | ⊚ |
| Example (6) | Ln6 | 1.438 | 0.37 | 3H | ⊚ |
| Example (7) | Ln7 | 1.433 | 0.31 | 3H | ⊚ |
| Example (8) | Ln8 | 1.434 | 0.32 | 3H | ⊚ |
| Example (9) | Ln9 | 1.438 | 0.38 | 3H | ⊚ |
| Example (10) | Ln10 | 1.435 | 0.35 | 3H | ⊚ |
| Example (11) | Ln11 | 1.435 | 0.36 | 3H | ⊚ |
| Example (12) | Ln12 | 1.433 | 0.34 | 3H | ○ |
| Example (13) | Ln13 | 1.432 | 0.32 | 3H | ○ |
| Comparative example (1) | Ln14 | 1.453 | 0.52 | 2H | Δ |
| Comparative example (2) | Ln15 | 1.440 | 0.42 | H or less | X |
| Comparative example (3) | Ln16 | 1.442 | 0.43 | H or less | X |
| Comparative example (4) | Ln17 | 1.430 | 0.31 | H or less | X |
| Comparative example (5) | Ln18 | 1.437 | 0.42 | H or less | X |
| Comparative example (6) | Ln19 | 1.431 | 0.32 | H or less | X |

As is evident from the present Example 2, the anti-reflection film samples for comparison, Comparative Examples (1) to (6), were poor in mechanical strength of the coating. In comparison with this, the anti-reflection film samples of the present invention, Examples (1) to (13), had very low surface reflectance and had sufficiently high mechanical strength of coating over a broad wavelength range.

{Preparation of a Display Device Equipped with an Anti-reflection Film}

The thus-prepared anti-reflection film samples, Examples (1) to (13) and Comparative examples (1) to (6), were provided (mounted), respectively, onto a display surface of a liquid crystal display of a personal computer PC 9821NS/340W (trade name) available from Nippon Electric Co., Ltd., to produce display device samples. The level of mirroring a background view on the surface of these produced samples owing to a surface reflection was evaluated by examination with the naked eye.

The display devices provided with the anti-reflection film samples of Comparative examples (1) to (6) reduced mirroring of a background view thereon to some extent, but their surface mechanical strength was poor. In contrast, the display devices provided with the anti-reflection film samples of Examples (1) to (13) according to the present invention had almost no mirroring of a background view thereon, and the display image was easily observed. Further, these display devices according to the present invention had a sufficient surface mechanical strength.

Having described our invention as related to the present embodiments, it is our intention that the invention not be limited by any of the details of the description, unless otherwise specified, but rather be construed broadly within its spirit and scope as set out in the accompanying claims.

We claim:

1. An anti-reflection film, comprising a low-refractive-index layer having a refractive index in the range of from 1.20 to 1.49 made of a cured coating of a copolymer that has a main chain consisting of carbon atoms, and that comprises a fluorine-containing vinyl monomer polymerizing unit and a polymerizing unit having in its side chain a (meth)acryloyl group, wherein the copolymer is represented by the following formula 2:

formula 2

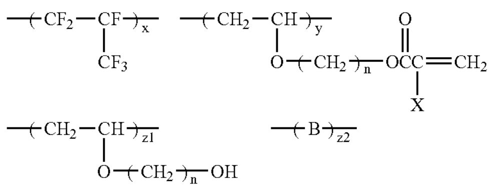

wherein X represents a hydrogen atom or a methyl group; x and y each represents a mole percent of the respective constituent, and x and y satisfy $30 \leqq x \leqq 60$ and $5 \leqq y \leqq 70$, respectively; B represents a polymerizing unit of any vinyl monomer, and may be composed of a single component or plural components: z1 and z2 each represents a mole percent of the respective constituent, and z1 and z2 satisfy $0 < z1 \leqq 65$, and $0 \leqq z2 \leqq 65$; and n is an integer satisfying $2 \leqq n \leqq 10$, with the proviso that the hydroxyalkyl vinyl ether monomer unit is contained in the copolymer.

2. The anti-reflection film as claimed in claim 1, wherein B is a vinyl ether derivative.

3. The anti-reflection film as claimed in claim 1, wherein the copolymer satisfy $40 \leqq x \leqq 60$, $30 \leqq y \leqq 60$, and $z2=0$.

4. The anti-reflection film as claimed in claim 1, wherein a component originating from the copolymer occupies 90% or more by mass of solid contents in the low-refractive-index layer.

5. The anti-reflection film as claimed in claim 1, wherein the low-refractive-index layer is formed on a high-refractive-index layer comprising inorganic fine particles and a polyfunctional (meth)acrylate resin.

6. An anti-reflection film, having the anti-reflection film according to claim 1, on a transparent support.

7. An image display device, wherein the anti-reflection film as claimed in claim 6 is arranged.

* * * * *